(No Model.) 2 Sheets—Sheet 1.

B. E. SERGEANT.
SAW MILL SET WORKS.

No. 317,221. Patented May 5, 1885.

WITNESSES:
Fred. G. Dieterich
Edw. W. Byrn.

INVENTOR:
Benj. E. Sergeant
BY Munn & Co
ATTORNEYS.

(No Model.) 2 Sheets—Sheet 2.

B. E. SERGEANT.
SAW MILL SET WORKS.

No. 317,221. Patented May 5, 1885.

WITNESSES:
Fred. G. Dieterich
Edw. W. Byrn.

INVENTOR:
Benj. E. Sergeant
BY Munn & Co
ATTORNEYS.

UNITED STATES PATENT OFFICE.

BENJAMIN E. SERGEANT, OF GREENSBOROUGH, NORTH CAROLINA.

SAW-MILL SET-WORKS.

SPECIFICATION forming part of Letters Patent No. 317,221, dated May 5, 1885.

Application filed February 17, 1885. (No model.)

*To all whom it may concern:*

Be it known that I, BENJAMIN EVANS SERGEANT, a citizen of the United States, residing at Greensborough, in the county of Guilford and State of North Carolina, have invented certain new and useful Improvements in Saw-Mill Set-Works, of which the following is a description.

Figure 1:
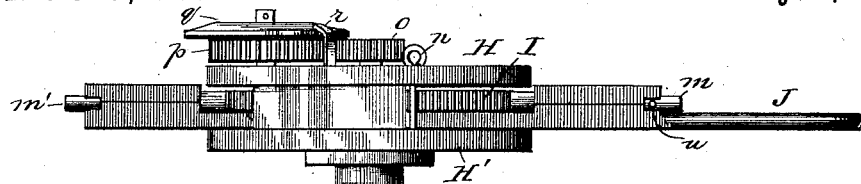
Figure 1:
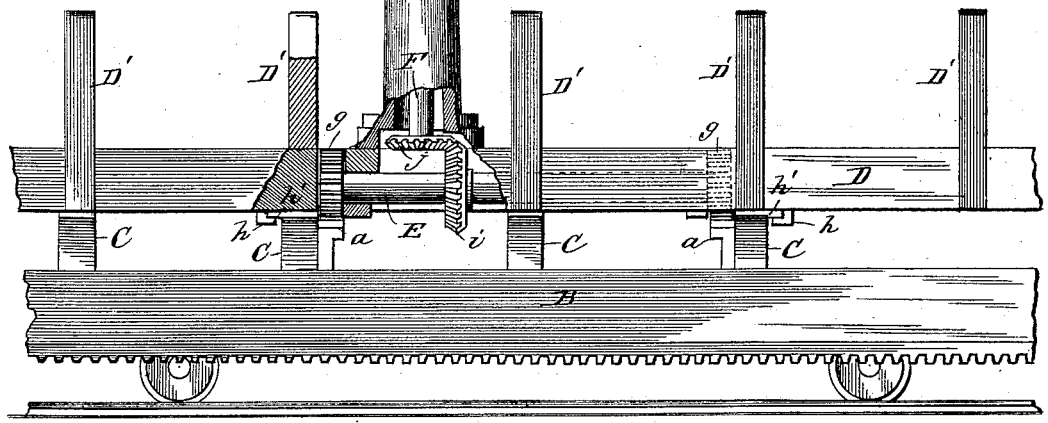
Figure 3:
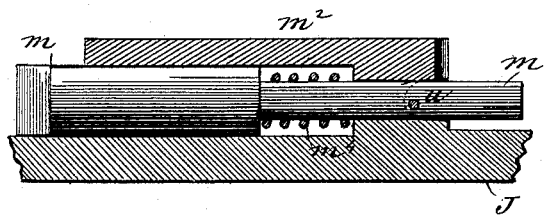
Figure 4:
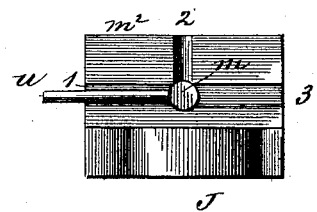
Figure 2:
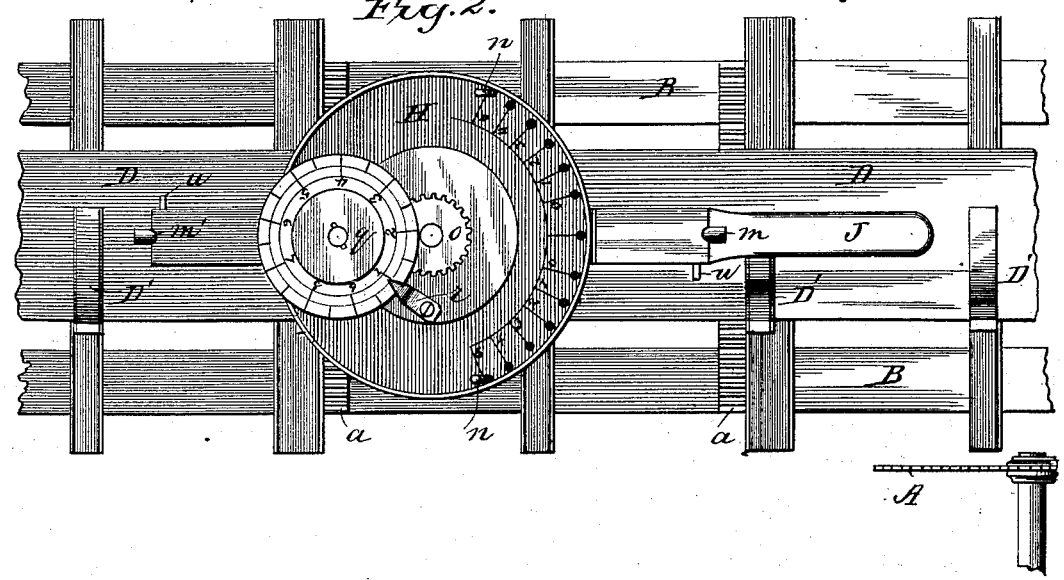
Figure 5:
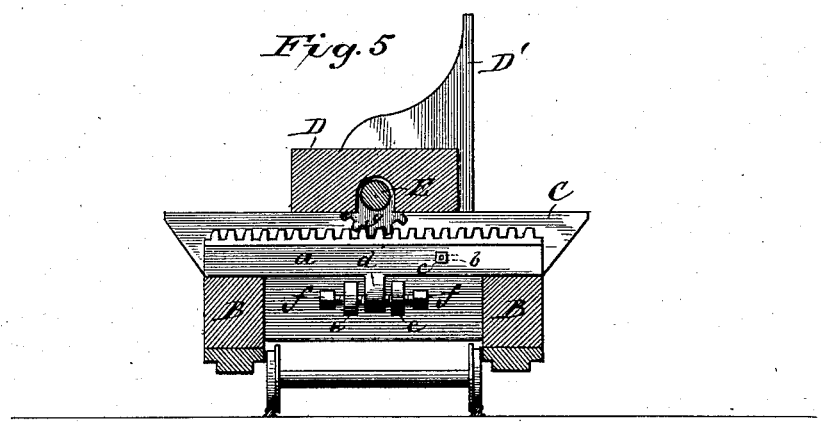

Figure 1 is a front elevation of the saw-carriage, partly broken away. Fig. 2 is a plan view. Fig. 3 is an enlarged sectional detail of one of the spring-pawls. Fig. 4 is an end view of the same, and Fig. 5 is a vertical transverse section of the carriage.

My invention relates to a saw-mill set-works designed to accurately and easily advance the log on the head-block a definite distance for each cut, and which feed mechamism is adapted to be disconnected to permit the knees to be quickly pushed back by direct pressure, thus saving much time. The construction of parts for carrying out the above movements is also designed with a view to simplicity and economy of construction, as will be hereinafter fully described.

In the drawings, A represents the saw, and B is the log-carriage, mounted to travel on longitudinal tracks parallel with the plane of the saw. Transversely on the carriage is fixed the head-blocks C, on which the log rests, and upon which there is the adjustable and laterally-moving log-bar D, having knees D'. To the sides of two or more of the the head-blocks is fastened upwardly-facing rack-bars a, the connection of said rack-bars to the head-blocks being adjustable to or from the line of the saw by elongated slots b in the head-blocks, through which there passes bolts c, that clamp the racks to the head-blocks. To keep these racks from moving longitudinally by the slipping of the bolts c in the slots b, (see Fig. 5,) a projection, d, is formed on the bottom of each rack, and depends between two lugs, e e, of the head-block or carriage-frame, through which lugs e set-screws f f are tapped and made to bear against the pendent projection d of the racks, so as to hold the racks from slipping. This adjustment of the racks serves a very convenient office, since it permits the throw of the log-bar to be nicely adjusted to the saw after the frame-work and carriage has been set up.

For advancing the log-bar toward the saw a longitudinal shaft, E, is journaled in bearings immediately under the log-bar, and is provided with pinions g g, that engage with the racks a a. This longitudinal bar may be placed either in a recess in the under side of the log-bar, as shown, or it may be placed outside of, but immediately below, the log-bar. In either case the log-bar is immediately above and covers it, and a much greater economy of space is obtained than when this shaft is located in the rear of the log-bar, as heretofore. To hold the log-bar down to place, transverse under-cut cleats h are made to catch and slide under the flanges h' of the head-blocks.

For giving motion to the shaft E to advance the log-bar, said shaft is provided with a bevel gear-wheel, i, that engages with a bevel gear-wheel, j, on a vertical shaft, F, that is journaled in bearings above and below, and is contained in a hollow column or pillar, G, erected on the log-bar and extending to about the height of the sawyer. To the top of this column is securely bolted an upper and lower disk, H H', between which is arranged a ratchet-wheel, I, and an oscillating horizontal lever, J. This ratchet-wheel I is keyed fast to the vertical shaft F, while the inner end of lever J loosely encircles said shaft. On this lever is carried a spring-pawl, m, that has a bevel face, which causes it to catch in the teeth of the ratchet-wheel when the lever is moved in one direction, and moves over the teeth when the lever is moved in the other direction. On the opposite side of the disks H H' there is another spring-pawl, m', of a similar construction, arranged to hold the ratchet-wheel while the pawl carried by the lever is moved back to take a fresh hold. Now, by oscillating the lever J it will be seen that motion is given to the ratchet-wheel I, vertical shaft F, and horizontal shaft E, which causes the pinions of the latter to traverse the racks of the head-blocks and give a set to the log-bar and knees advancing the log to the saw. To render this set definite and variable, the disks H H' are perforated with a circular series of holes near their peripheries, on one side, and stop-pins *n* are arranged in these holes, which limit the throw of the lever and determine the amount of set. By placing these pins at different distances from each other, the holes being graduated and numbered, it will be seen that the set may be quickly changed to a greater or less throw, as desired.

On the end of the vertical shaft F which protrudes through the upper disk, H, a pinion, *o*, is keyed, which is made to mesh with a toothed wheel, *p*, on the under side of a graduated disk, *q*, which latter turns on a center pin mounted on disk H, and which graduated disk passes under an overlapping stationary index-finger, *r*. This graduated disk is subdivided and adapted to show the distance between the knees and the saw, so that the sawyer may be able to discover this at a glance and determine the extent of cutting.

In order to make the setting apparatus work either backward or forward, the teeth of the ratchet-wheel I are straight teeth, and the pawls *m m'* are axially adjustable, so as to reverse their bevel faces. For this purpose a longitudinal bearing is made in the lever J for pawl *m*, (see Fig. 3,) and a cap or top box, $m^2$, closes in the pawl, which is in the nature of a rectilinearly-sliding stem encircled by a spiral spring, $m^4$, whose tension forces the pawl in toward the ratchet-wheel.

As each of the pawls *m* and *m'* is similarly equipped, it will only be necessary to describe one. At the end of the bearing of each pawl there are three notches, 1 2 3, (see Fig. 4,) of which 1 and 3 are diametrical or separated the distance of one hundred and eighty degrees, while 2 is intermediate to the others, and is not nearly so deep. At the end of the pawl is a radial pin, *u*, which, when resting in the notch 1, is adapted to co-operate with the ratchet-wheel when worked in one direction, and which pin when turned one hundred and eighty degrees, and resting in notch 3, reverses the pawl and adapts it to co-operate with the ratchet-wheel when working in the opposite direction. When the pawl is turned in its axis, and the pin rests in the intermediate notch, the said pawl is drawn back against its spring, and does not engage the ratchet-wheel at all. This latter adjustment is one of great utility and convenience, as it permits the sawyer to push back the log-bar and knees by direct pressure, thus quickly resetting the carriage for a new log and saving much valuable time and labor.

Having thus described my invention, what I claim as new is—

1. The combination, in a saw-mill set-works, of the head-blocks C, having racks *a*, the log-bar D, and the shaft E, arranged longitudinally with the log-bar and immediately beneath or within the same, and having pinions *g g*, meshing with the racks, a vertical column, G, mounted on the log-bar, and bearing a lever and ratchet-mechanism, and containing a shaft connected to the shaft E by bevel-gears, as and for the purpose described.

2. The combination, with the head-blocks, log-bar, knees, carriage, and setting mechanism of a saw-mill, of a normally-stationary rack attached to said head-block at right angles to the path of the carriage, and means, substantially as described, for adjusting said rack-bar in a right line at right angles to the path of the carriage and plane of the saw to or from the latter, whereby the rack, log-bar, and knees may be together adjusted to or from the saw, substantially as described.

3. The combination, with the head-blocks having longitudinal slots *b* and laterally-projecting lugs *e e*, of the racks having bolts *c* passing through said slots, and projection *d*, depending between the lugs, and the set-screws *f*, bearing against projection *d*, substantially as described.

4. The combination, with the log-bar and its setting mechanism, as described, of the vertical shaft F, the hollow column having disks H H', the ratchet-wheel I, located between them, the horizontal lever J, hung upon shaft F, and arranged between said disks, and having axially-adjustable spring-seated pawl *m* with pin *u*, and the triple notched bearings 1 2 3, substantially as shown and described.

5. The combination, with the log-bar D and its attached setting mechanism, the vertical shaft F, ratchet-wheel I, and lever J, bearing a pawl, of the upper and lower disks, H H', arranged horizontally upon opposite sides of the ratchet wheel and lever, and perforated, as described, and provided with stop-pins for limiting the throw of the lever, as set forth.

6. The combination, with the log-bar D and its attached setting mechanism, of the vertical shaft F, bearing ratchet-wheel I and lever J, the upper and lower disks, H H', arranged upon opposite sides of the ratchet-wheel and lever, the pinion *o*, fixed rigidly to shaft F, toothed wheel *p*, and graduated disk *q*, and index-hand *r*, substantially as and for the purpose described.

The above specification of my invention signed by me in the presence of two subscribing witnesses.

BENJAMIN E. SERGEANT.

Witnesses:
EDW. W. BYRN,
SOLON C. KEMON.